US007027171B1

(12) United States Patent
Watanabe

(10) Patent No.: US 7,027,171 B1
(45) Date of Patent: Apr. 11, 2006

(54) DIGITAL CAMERA AND DOCUMENT PHOTOGRAPHING AND TRANSMITTING METHOD OF THE SAME

(75) Inventor: Yoshikazu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/537,405

(22) Filed: Mar. 29, 2000

(30) Foreign Application Priority Data

Mar. 30, 1999 (JP) .................................. 11-090224
Jan. 20, 2000 (JP) ............................. 2000-012217

(51) Int. Cl.
*G06K 1/00* (2006.01)
*G06F 15/00* (2006.01)

(52) U.S. Cl. ................. 358/1.15; 358/488; 382/112; 382/164

(58) Field of Classification Search ........... 358/1.15, 358/18, 488, 1.14; 355/18; 396/429, 55, 396/229, 266; 382/313, 317, 318, 321, 112, 382/164, 289, 488; 399/1, 38
See application file for complete search history.

(56) References Cited

U.S. PATENT DOCUMENTS

| 6,167,469 A | * | 12/2000 | Safai et al. ................... 710/62 |
| 6,304,313 B1 | * | 10/2001 | Honma ........................ 355/18 |
| 2001/0015760 A1 | * | 8/2001 | Fellegara et al. ...... 348/333.01 |

FOREIGN PATENT DOCUMENTS

| JP | 2-21782 | 1/1990 |
| JP | 6-256907 | 9/1994 |
| JP | 7-212707 | 8/1995 |
| JP | 7-336581 | 12/1995 |
| JP | 8-125870 | 5/1996 |
| JP | 9-23375 | 1/1997 |
| JP | 10-3109 | 1/1998 |
| JP | 10-65867 | 3/1998 |
| JP | 10-336574 | 12/1998 |
| JP | 11-46331 | 2/1999 |
| JP | 11084482 A | * | 3/1999 |

* cited by examiner

*Primary Examiner*—Gabriel Garcia
*Assistant Examiner*—Thierry L. Pham
(74) *Attorney, Agent, or Firm*—Oblon, Spivak, McClelland, Maier & Neustadt, P.C.

(57) ABSTRACT

An image processing section provided in a digital camera converts the image photographed in a document photographing mode to any data format that a destination (a facsimile or a personal computer) selected by a user requires.

61 Claims, 12 Drawing Sheets

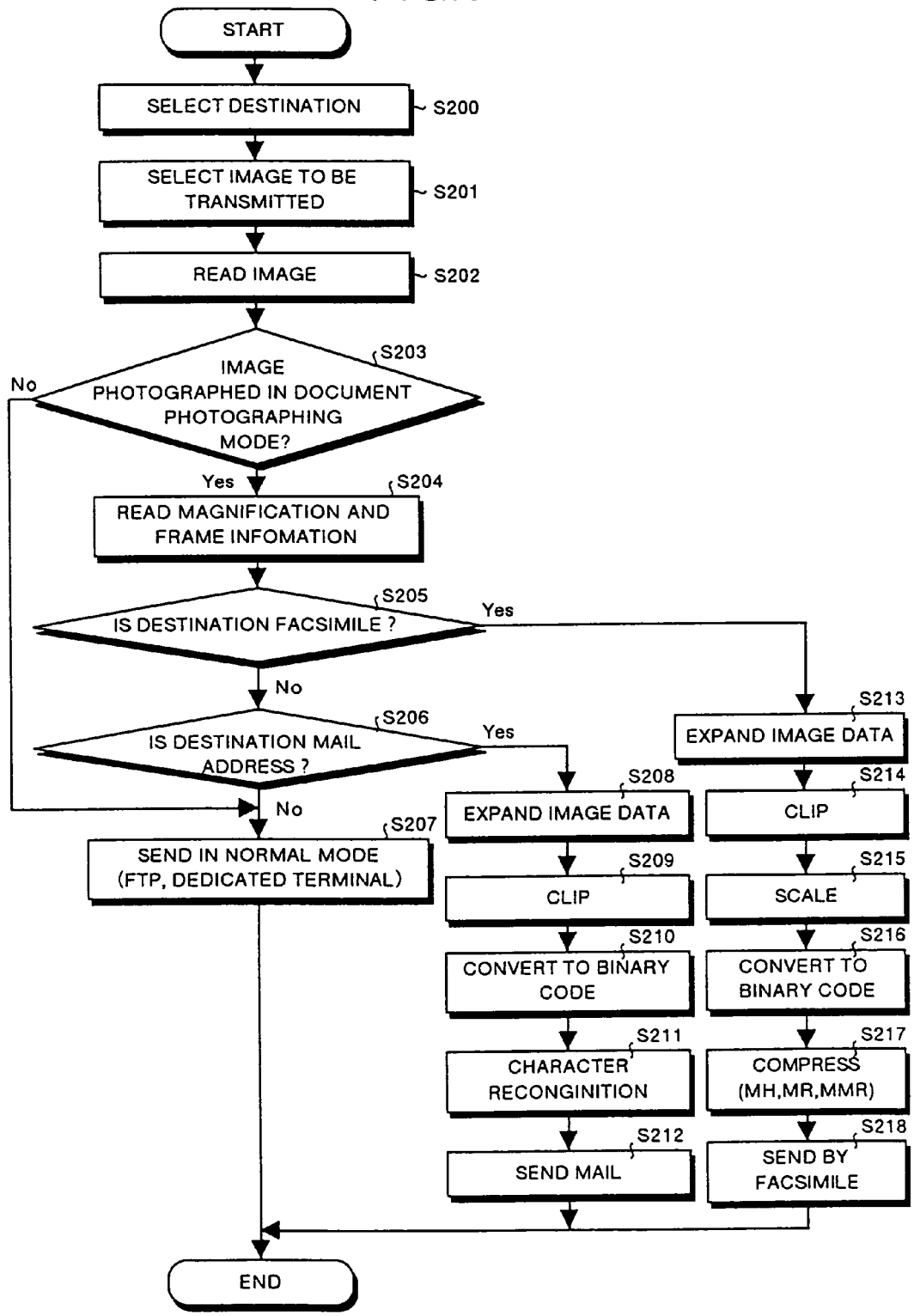

| DESTINATION | TYPE | TELEPHONE NUMBER | MAIL ADDRESS | GUIDANCE FRAME DISPLAY INFORMATION | DOCUMENT SIZE | IMAGE DELETION FLAG |
|---|---|---|---|---|---|---|
| COMPANY A | PC | — | campanya@a.co.jp | 0 | — | 0 |
| TARO YAMADA | FAX | 03-3541-***** | — | 1 | A4 | 1 |
| TRADING COMPANY B | PC | — | campanyb@b.co.jp | 0 | — | 0 |
| STORE C | FAX | 03-3683-***** | — | 1 | B5 | 1 |
| HANKO ISHIYAMA | FAX | 03-3543-***** | — | 1 | A4 | 0 |
| · | · | · | · | · | · | · |
| · | · | · | · | · | · | · |
| · | · | · | · | · | · | · |

DIGITAL CAMERA AND DOCUMENT PHOTOGRAPHING AND TRANSMITTING METHOD OF THE SAME

FIELD OF THE INVENTION

The present invention relates to a digital camera. More particularly, this invention relates to a digital camera which has a document photographing mode in addition to the normal photographing mode.

BACKGROUND OF THE INVENTION

The present day digital camera includes many functions. For example, there is known a digital camera which has a character photographing mode in addition to a normal photographing mode. The normal photographing mode is the mode in which ordinary snapshots, for example, photographs of scenery are taken. In the character photographing mode, the digital camera subjects data to image processing so as to improve the appearance of the characters.

There is a digital still camera disclosed in Japanese patent application laid open No. HEI 08-125870. This digital still camera has a structure as follows. The digital still camera has the normal photographing mode and the document photographing mode. Any one of these two modes can be selected. When the normal photographing mode is selected, image data is compressed by a natural picture compression unit. Whereas image data is compressed by a document compression unit (a compression method appropriate for an image with a small number of gray levels in achromatic color) when the document photographing mode is selected. The compressed image data is then stored in an externally provided memory. Therefore, the image data can efficiently be compressed irrespective of whether the data belongs to a picture or belongs to a photograph of a document without degradation in image quality.

However, the conventional type of digital camera has a problem that the data of the captured image can not effectively be used. More specifically, the digital camera having the character photographing mode can not transmit the captured image as through a facsimile. In order to transmit the image as a facsimile, following process is carried out. First, the image is transmitted to a computer where the image is subjected to processing such as expansion, image conversion, compression, or the like and then only the image can be transmitted as a facsimile.

Further, in the digital still camera described above, the compression method is uniquely determined based on the photographing mode. For example, when a document (for example, an encyclopedia) which contains picture of scenery is photographed, and if the picture is photographed in the document mode, the image data is compressed by the compression method suitable for an image with a small number of gray levels in achromatic color. Resultantly, the picture of the scenery can not be reproduced properly. Therefore, the user is required to photograph the same document in the normal photographing mode. Thus, the user has to choose the photographing modes based on the purpose of using the document.

SUMMARY OF THE INVENTION

It is an object of this invention to provide a digital camera which can improve the use of the image photographed in the document photographing mode.

According to one aspect of this invention, an expansion unit expands compressed image data photographed in the document photographing mode and stored in a storage unit and an image processing unit then subjects the data to any image processing that a destination requires. Therefore, the image photographed in the document photographing mode can be converted to any format suitable for the destination.

According to another aspect of this invention, an image processing unit subjects the image data photographed in the document photographing mode to any image processing that a destination requires. Therefore, the image photographed in the document photographing mode can be converted to any format suitable for the destination.

According to still another aspect of this invention, an expansion unit expands a compressed image data acquired in the document photographing mode and stored in a storage unit, and an image processing unit then subjects the data to the processing such as clipping, conversion to a smaller number of gray levels in achromatic color, and resolution conversion, and once more compresses the data. Therefore, the image photographed in the document photographing mode can be converted to any format suitable for a destination (e.g., a facsimile).

According to still another aspect of this invention, an image processing unit subjects the image data acquired in the document photographing mode to the processing such as clipping, conversion to a smaller number of gray levels in achromatic color, and resolution conversion, and once more compresses the data. Therefore, the image photographed in the document photographing mode can be converted to any format suitable for a destination (e.g., a facsimile).

According to still another aspect of this invention, an expansion unit expands the compressed image data acquired in the document photographing mode and stored in a storage unit, and an image processing unit then subjects the image data to the processing such as clipping, and conversion to a smaller number of gray levels in achromatic color, and character recognition. Therefore, the image photographed in the document photographing mode can be converted to any format suitable for a destination (e.g., a facsimile).

According to still another aspect of this invention, an image processing unit subjects the image data acquired in the document photographing mode to the processing such as clipping, and conversion to a smaller number of gray levels in achromatic color, and character recognition. Therefore, the image photographed in the document photographing mode can be converted to any format (e.g., a text document) suitable for a destination.

According to still another aspect of this invention, in the document photographing mode, a display unit displays the guidance to notify a user of photographing conditions of a document during displaying of the picture of the subject on the monitor before it is photographed. Therefore, the user can easily fix the location of the document.

According to still another aspect of this invention, an angle of photography detection unit which detects the angle of photography is provided. In the document photographing mode, photography is started only when the angle of photography is substantially vertical to the surface of the subject. Therefore, a proper image of the document can be obtained.

According to still another aspect of this invention, there are provided the steps of monitoring a subject on the display unit in response to instructions for monitoring, displaying guidance on the display unit when the monitoring is performed, capturing an image and compressing the image data in response to instructions for photographing, storing the compressed image data in a storage unit, reading the compressed image data stored in the storage unit and expanding the data in response to instructions for transmission, subjecting the expanded image data to any image processing that a destination requires, and transmitting the image data, that has been subjected to image processing, to the destination. Therefore, the image can be converted to any format suitable for the destination.

According to still another aspect of this invention, there are provided the steps of monitoring a subject on the display unit in response to instructions for monitoring, displaying guidance on the display unit when the monitoring is performed, capturing an image in response to instructions for photographing, subjecting the data of the captured image to any image processing that a destination requires, and transmitting the image data, that has been subjected to image processing, to the destination. Therefore, the image can be converted to any format suitable for the destination and transmitted immediately.

Other objects and features of this invention will become apparent from the following description with reference to the accompanying drawings.

BRIEF DESCRIPTION OF THE DRAWINGS

FIG. 6 shows a flow chart of operation when a photographed image is transmitted to an external device in the first embodiment;

FIG. 8 shows an example of the structure of the destination memory shown in FIG. 7;

DESCRIPTION OF THE PREFERRED EMBODIMENTS

Preferred embodiments of the present invention are explained in detail below with reference to the attached drawings.

Figure 1:
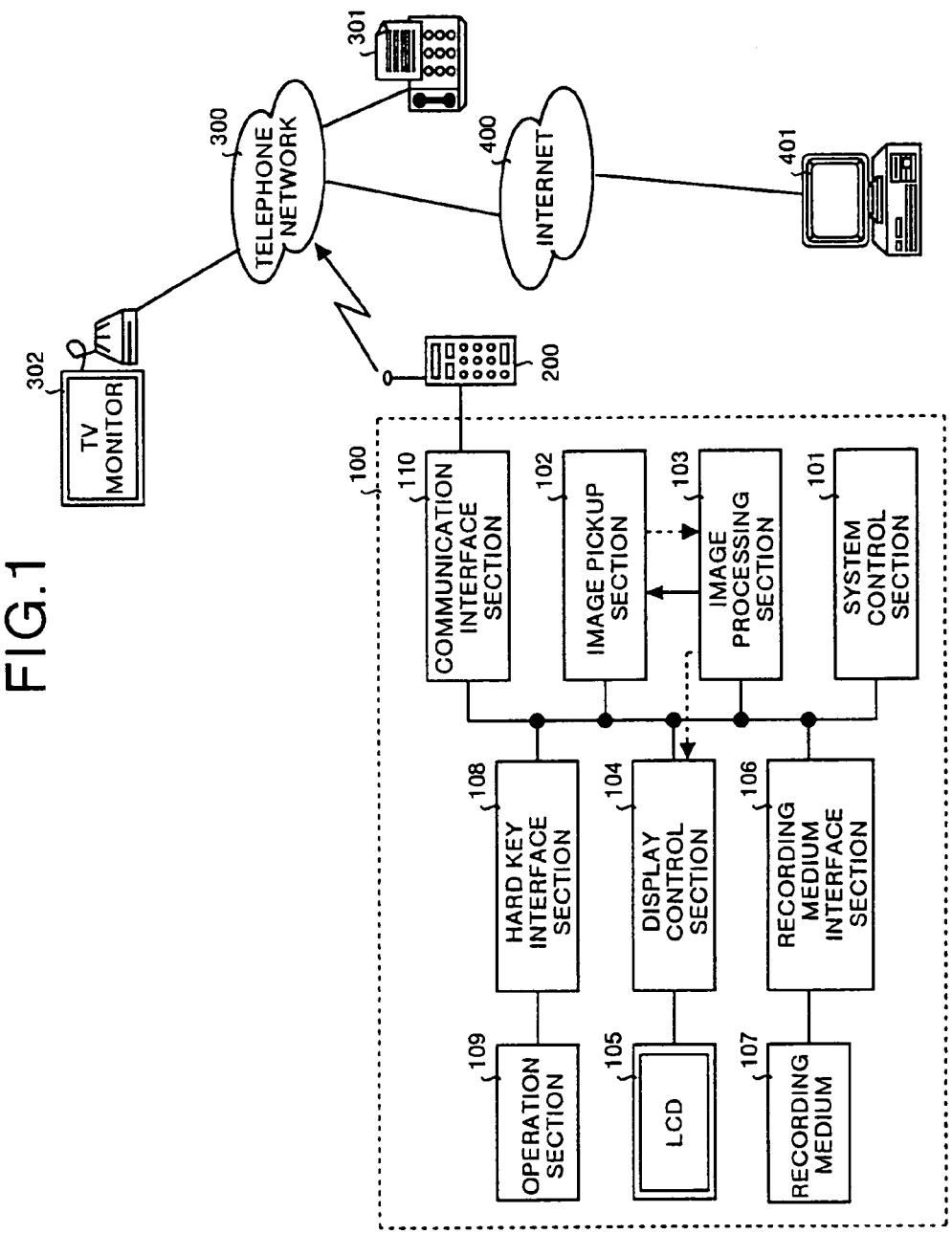
FIG. 1 shows a configuration of a digital camera according to a first embodiment.

FIG. 1 shows a configuration of a digital camera according to a first embodiment. Reference numeral 100 represents the digital camera. This digital camera 100 comprises, as shown in FIG. 1, a system control section 101 which controls the entire system of the digital camera, and an image pickup section 102 which picks up a subject image and converts the image to image data. The digital camera 100 further comprises an image processing section 103 which subjects the image data output from the image pickup section 102 to image processing, and a display control section 104 which controls the display of the image processed in the image processing section 103 to an LCD 105. The LCD 105 is for displaying the image. There is also provided a recording medium interface section 106 which is an interface of a recording medium 107. The recording medium 107 stores the compressed image data. There is further provided a hard key interface section 108 which detects key operations in an operation section 109. Through the operation section 109, a user gives instructions to the digital camera. There is provided a communication interface section 110 which performs data communications with the outside.

The system control section 101 provides controls for the entire system of the digital camera as explained above. More specifically, although not shown here, this system control section 101 comprises a ROM, a RAM, and a timer. The CPU controls the entire system of the digital camera according to a program stored in a ROM. The ROM stores the program to operate the CPU. The RAM is used as a work area of the CPU. The timer counts the time.

The image pickup section 102 picks up an image of a subject (subject image) and outputs image data as explained above. More specifically, although not shown here, this image pickup section 102 comprises optical system components including a lens, a CCD, a lens driving motor, a CCD drive circuit, and an A/D converter. The lens forms the subject image. The lens driving motor drives the lens. The CCD converts the subject image into electric signals (analog image data). The CCD drive circuit drives the CCD. The A/D converter converts the analog image data output from the CCD to digital signals (digital image data).

The image processing section 103 comprises a DSP (Digital Signal Processor) for image processing and memory. More specifically, this DSP subjects the image data obtained in the image pickup section 102 to various types of image processing. Further, the DSP performs focusing and adjustments to exposure by controlling timing of driving the CCD in the image pickup section 102 and the lens driving motor, and also performs compression or expansion of the image data.

The display control section 104 subjects the image data processed in the image processing section 103 to signal processing so that it can be displayed on the LCD 105. Further, the display control section 104 generates various graphical images for the user interface, and displays the generated images on the LCD 105. The LCD 105 displays a subject image, and also displays graphics for the user interface.

The recording medium interface section 106 comprises a memory card controller that is provided for an interface with the recording medium 107. Various types of information related to the compressed image data and images are recorded in the recording medium 107.

The hard key interface section 108 comprises a parallel port that is provided to detect a state of hardware for the user interface such as keys and a dial in the operation section 109. The operation section 109 is used when the user wants to give any instructions regarding the operations to the digital camera. More specifically, although not shown here, the operation section 109 comprises a release button to instruct photographing, and a photographing mode key used to select between the normal photographing mode to photograph a natural picture and the document photographing mode to photograph characters clearly. The operation section 109 further comprises a fixed document size setting key used to select between fixed document sizes (A size, letter, legal size, and so forth). The communication interface 110 comprises a communication controller, which is provided for performing data communications with the outside through a communication device such as a portable telephone 200.

In FIG. 1, reference numeral 200 represents a portable telephone that is connected to the communication interface section 110 of the digital camera to perform data communication with the outside. Reference numeral 300 represents a telephone network. Reference numeral 301 represents a facsimile connected to the telephone network 300. Reference numeral 302 represents a dedicated terminal (which receives and stores images from the digital camera and displays the images on a TV monitor) connected to the telephone network 300.

Further, reference numeral 400 represents the Internet to which the telephone network 300 is connected. Reference numeral 401 represents a personal computer connected to the Internet 400. The digital camera 100 can perform data communications, via the portable telephone 200, with any device (e.g., the facsimile 301 or the dedicated terminal 302) connected to the telephone network 300 and any device (e.g., the personal computer 401) connected to the Internet 400.

The overview of photographing operation of the digital camera 100 having the configuration is explained below. The user operates a photographing mode key of the operation section 109 before photographing, and sets the digital camera in a photographing mode (a normal photographing mode, a document photographing mode, and so forth). The contents of operation through the operation section 109 are determined by the system control section 101 through the hard key interface section 108. The system control section 101 generates a guidance graphic on the display control section 104 according to the operation, and then guides the user to perform the next operation.

The system control section 101 sets, at the instant the photographing mode is selected, processing parameters corresponding to the mode in the image processing section 103. If the state of the release button, that is not shown in FIG. 1, being half-pressed has been detected after the camera is ready for photographing, this half-pressed operation is determined by the system control section 101 via the hard key interface section 108 in the same manner as the mode setting.

The image pickup section 102 starts an image pickup operation to display the preview of the image on the LCD 105 before photographing is actually performed, under the controls of the image processing section 103. The data for the image picked up by the image pickup section 102 is continuously sent to the image processing section 103. The image processing section 103 then subjects the image data to the processing such as color space conversion, γ correction, and white balance adjustment, and transfers the processed image data to the display control section 104. Concurrently with these operations, the image processing section 103 detects how focus and exposure are achieved, and makes necessary adjustment to focus and exposure by controlling the image pickup section 102.

The display control section 104 subjects the image data to signal processing and displays the data on the LCD 105 to show how the image is photographed to the user. The operation of pressing the release button of the operation section 109 is then determined by the system control section 101 through the hard key interface section 108 in a like manner. The image pickup section 102 captures a subject image according to the controls of the image processing section 103, and outputs the data for the image to the image processing section 103. Whereas the image processing section 103 subjects the data to image processing and compression processing corresponding to the photographing mode.

The system control section 101 reads the image data compressed in the image processing section 103, adds header information to this compressed image data, and then writes the data as an image file in the recording medium 107 via the recording medium interface section 106. This header information includes information for the selected photographing mode and information for the photographed date and time, or the like. A series of photographing operations is then complete.

Figure 2:
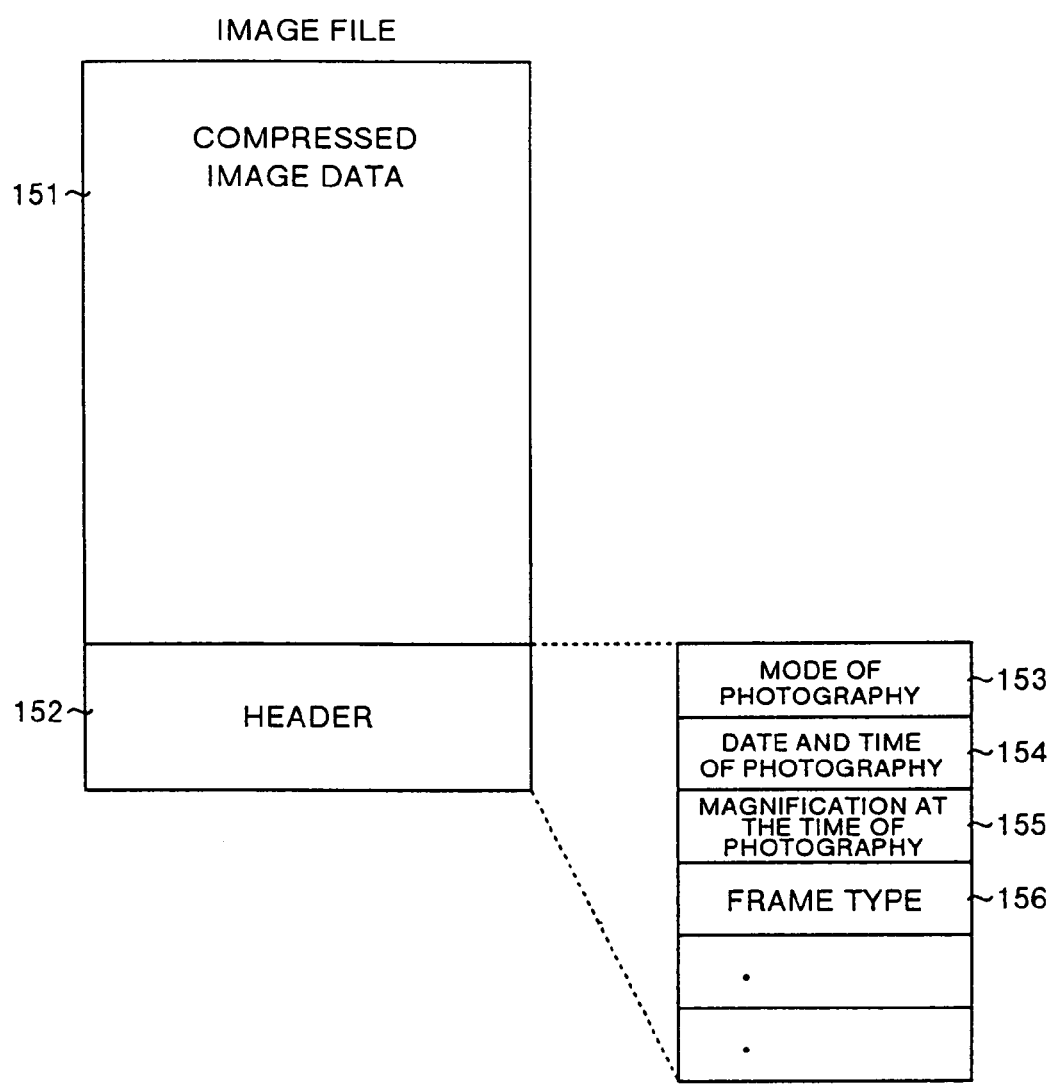
FIG. 2 shows an example of an image-file format.

FIG. 2 shows an example of an image-file format. This image file consists of compressed image data and a header as shown in the figure. The header includes information such as the mode of photography, date and time of photography, magnification at the time of photography, and a frame type.

The overview of operation of data communications in the digital camera 100 is explained below. The user connects the portable telephone 200 to the digital camera 100. The user then specifies a destination of the image, through operation of the operation section 109, and selects the image to be transmitted in the same manner as the setting of a photographing mode. The system control section 101 originates a call via the portable telephone 200 and establishes a communication line by controlling the communication interface section 110. The system control section 101 then reads the file of the specified image from the recording medium 107, and transmits the image file in accordance with a predetermined protocol.

The schematic operations in the cases where the digital camera 100 performs data communications with the facsimile 301, the personal computer 401, and the dedicated terminal 302 are explained below.

When data communications with the facsimile 301 (facsimile transmission) are performed, the digital camera 100 transmits the image, that has been compressed and stored as binary information on photographing, to the facsimile 301 in accordance with the facsimile protocol on the telephone network 300 using the method, for instance, disclosed in Japanese patent application laid open No. HEI 08-125870.

When data communications with the personal computer 401 are performed, the digital camera 100 transmits the image to the personal computer 401 via the telephone network 300 and the Internet 400. In this case, the digital camera 100 transmits the image, compressed and stored in the normal photographing mode (JPEG compression), to the personal computer 401 in accordance with FTP (File-Transfer Protocol) or SMTP (Simple Mail Transfer Protocol) as an attached file to a mail document. In the above case, however, the digital camera 100 is generally connected to a server (not shown), which is connected to the Internet 400 using PPP (Point-to-Point Protocol).

When data communications with the dedicated terminal 302 are performed, the digital camera 100 transmits the image to the dedicated terminal 302 via the telephone network 300. In this case a particular protocol is used for the data communications. Each type of these communications protocols (attribute of destination) is stored as destination information in a one-to-one correspondence between a type of protocol, a telephone number, and an Internet address. The user only selects a destination, and then the corresponding protocol is automatically selected and executed.

Figure 3:
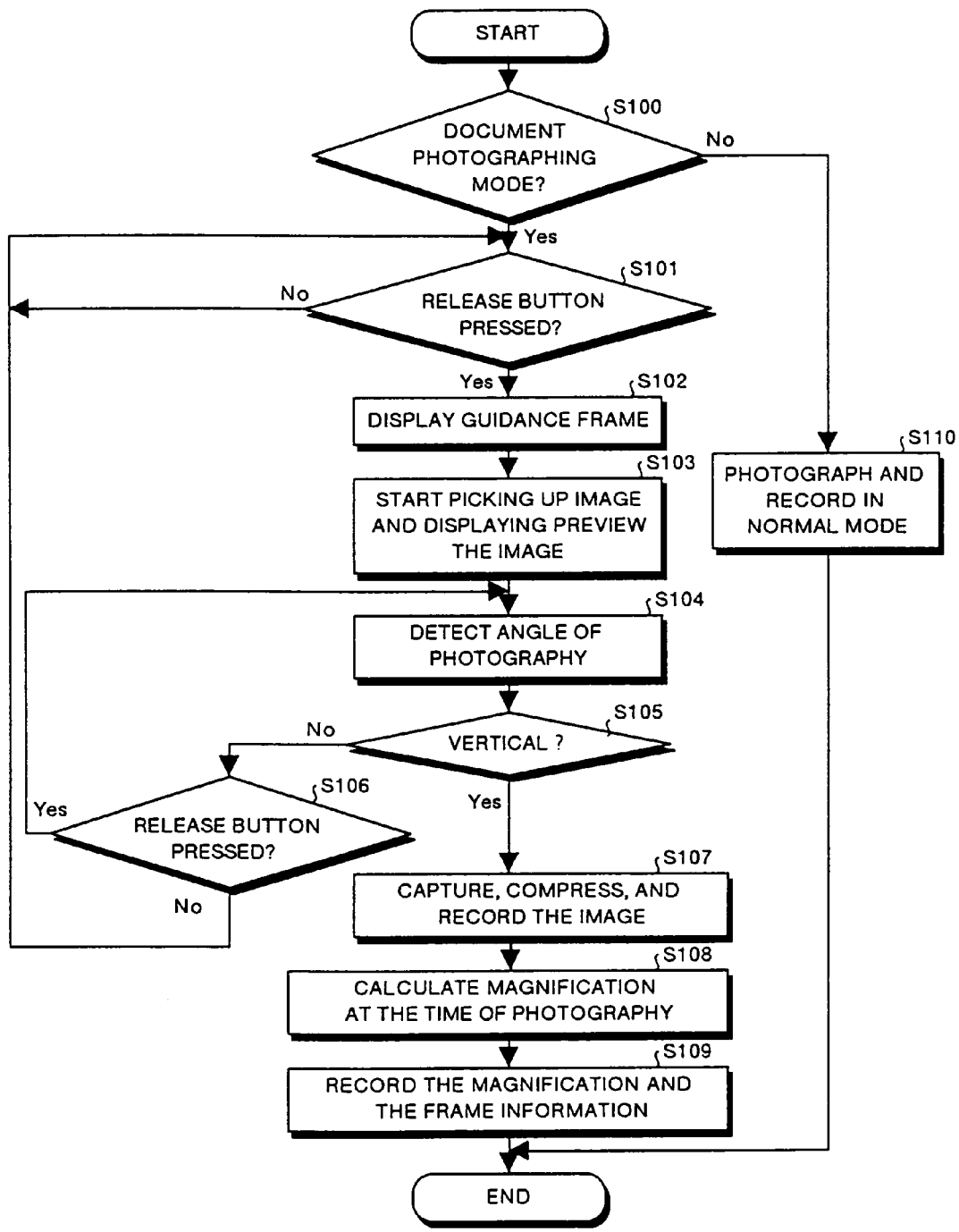
FIG. 3 shows a flow chart of photographing operation when the document photographing mode is selected in the first embodiment.
Figure 4:
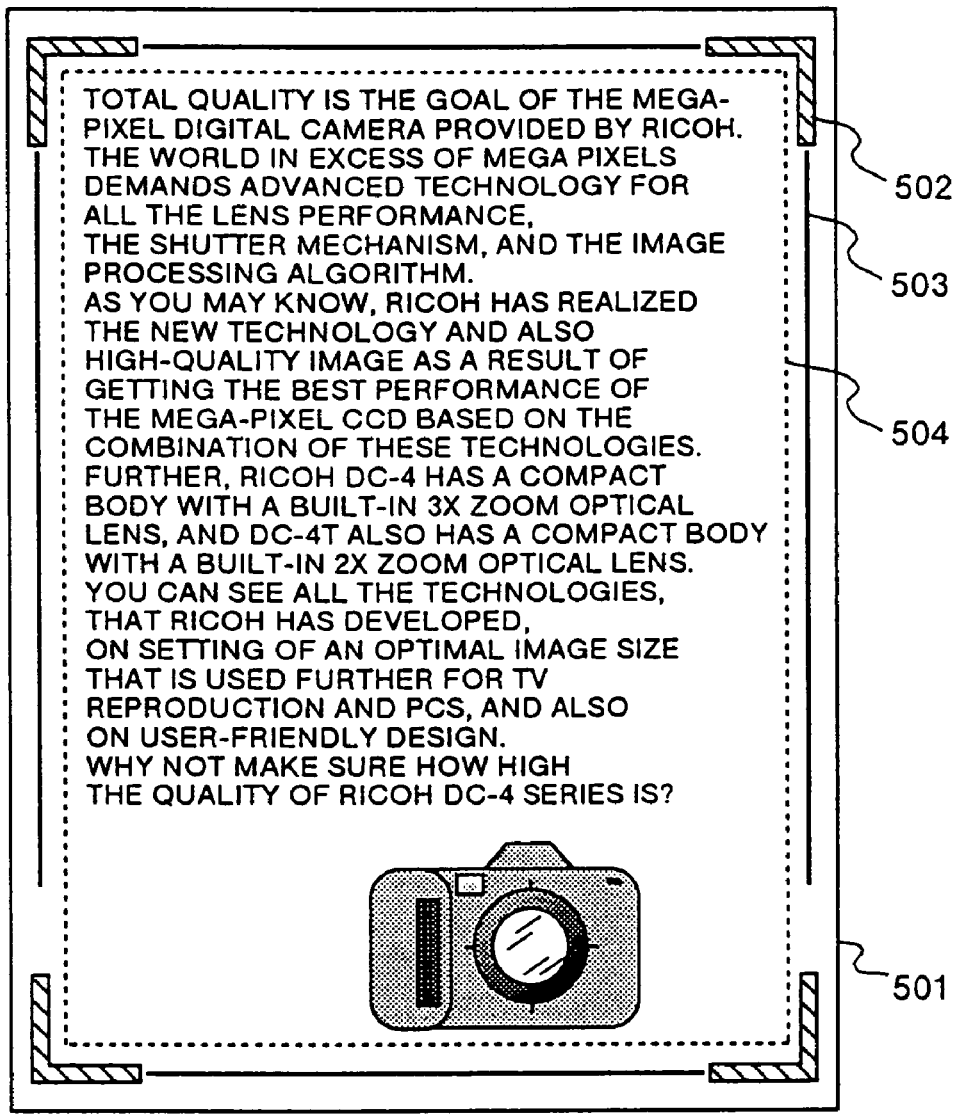
FIG. 4 shows an example of guidance display.
Figure 5A:
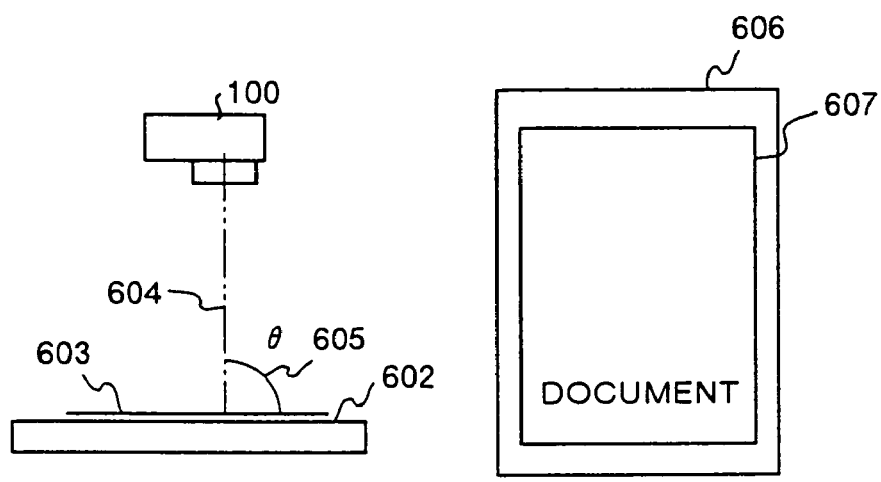
FIG. 5A and FIG. 5B explain about the angle of photography.
Figure 5B:
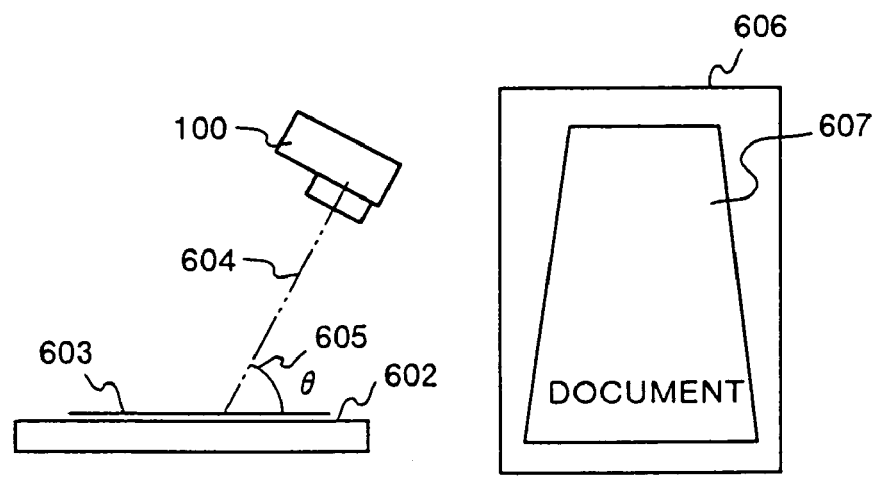

Photographing operation in the case where the document photographing mode is selected is explained below with reference to FIG. 3 to FIG. 5. FIG. 3 shows a flow chart of photographing operation when the document photographing mode is selected. FIG. 4 shows an example of guidance display on the LCD 105. FIG. 5A and FIG. 5B show how to detect the angle of photography.

The user selects, when photographing is to be carried out in the document photographing mode, the document photographing mode with the photographing mode key of the operation section 109, and further selects the fixed document size (A size, letter, legal size, and so forth) of an image to be picked up with the regular document size setting key.

In FIG. 3, the system control section 101 first identifies the current photographing mode (step S100). When the current mode is the normal photographing mode, the system control section 101 proceeds to step S110, and then performs normal photographing and recording.

On the other hand, when it is determined, at step S100, that the current mode is the document photographing mode, the system control section 101 monitors the information relating to keys pressed in the hard key interface section 108. When it is determined that the release button has been pressed (step S101), the system control section 101 displays a guidance frame on the LCD 105 in order that the user can easily fix the location of a document (step S102). The system control section 101 then starts picking up a document image and displays the preview of the image (the subject is displayed on the monitor) (step S103).

The display of a guidance frame is explained below with reference to FIG. 4. In FIG. 4, reference numeral 501 represents the frame of the LCD 105, 502 represents the displayed guidance frame. Reference numeral 503 represents a document to be photographed, and 504 represents an area to be cut out by the processing of clipping, that is explained later. The frame to be displayed here is displayed based on the aspect ratio of a regular document size selected when the document photographing mode is selected.

The system control section 101 then issues an instruction to detect an angle of photography of the subject (document) to the image processing section 103. In response to reception of the instruction, the image processing section 103 detects the angle of photography of the subject, and the system control section 101 reads the detected angle of photography (step S104). The system control section 101 then determines whether the angle of photography is vertical to the surface of the subject (step S105). About the angle of photography and the method of detecting this angle are explained below with reference to FIG. 5A and FIG. 5B.

In FIG. 5A and FIG. 5B, reference numeral 100 is the digital camera, 602 represents a base where a document 603 is placed. Reference numeral 603 represents a document to be photographed, and 604 represents an optical axis of the digital camera 100. Reference numeral 605 is the angle of photography, 606 represents the frame of the LCD 105, and 607 represents a display how the document 603 is photographed.

FIG. 5A shows a case where the angle of photography is vertical. In this case, a rectangular document is displayed in a rectangular shape. FIG. 5B shows a case where the angle of photography is inclined. In this case, the rectangular document is displayed in a trapezoidal shape, which is not correct. In order to facilitate understanding, FIG. 5B shows a deformation in a direction which is parallel to the length of the document. In an actual case, however, there is also a deformation in direction which is parallel to the width of the document. In this case, the photographed image becomes a more distorted rectangle, and this picked-up image changes seamlessly in association with inclinations of the digital camera 100.

The image processing section 103 recognizes the shape of the captured document (which is not the shape of the actual document but the shape of the picked-up image of the picked-up document), and detects the state shown in FIG. 5A (the state where the angle of photography is vertical). As the method for recognizing the shape of a document, any known method can be used, therefore, the detailed explanation is omitted.

At step S105, when it is determined that the angle of photography is not vertical, the system control section 101 proceeds to step S106, and determines whether the release button has been pressed. When the release button has not been pressed, the system control section 101 returns to step S101. When the release button has been pressed, on the other hand, the system control section 101 detects again the angle of photography again (step S104).

At step S105, on the other hand, when it is determined that the angle of photography is vertical, the system control section 101 allows the image pickup section 102 to capture an image in the same manner as that of the case where the release button has been pressed in the normal photographing mode. The system control section 101 then allows the image processing section 103 to compress the data of the captured image, and further records the data in the recording medium 107 via the recording medium interface section 106 (step S107).

Further, the system control section 101 reads the lens-to-subject distance (the distance from the digital camera 100 to the document (subject document)), detected during focusing on photographing, from the image processing section 103. The system control section 101 then calculates the magnification at the time of photography (a focal length of a lens/a lens-to-subject distance) (step S108), and records the magnification, as an image file, which is correlated to the photographed image together with the information for the frame type in the recording medium 107 (step S109).

As explained above, according to the example of the operation, when photographing is performed in the document photographing mode, the guidance, which helps the user fix the location of a document, is displayed. Therefore, the user can fix the location of the document, thus the usability of the digital camera for the user can be improved.

Further, according to the example of the operation, as a guidance display, the guidance frame is displayed so that the user can recognize the area at the aspect ratio of regular-size paper. Therefore, the user can fix the location of a document based on the size of the regular-size paper, thus the usability of the digital camera for the user can be more improved.

Further, according to the example of the operation, when the angle of photography is vertical to the document at the time of photographing in the document photographing mode, the photographing is automatically performed. Therefore, the document can be photographed at the appropriate angle, thus the usability of the digital camera for the user can be improved.

Further, according to the example of the operation, the image processing section 103 detects the angle of photography by recognizing the shape of the picked-up image of a picked-up document. Therefore, it is possible to detect a proper angle of photography regardless of how the document to be photographed is placed, and the angle of photography can be detected with a simple and low-cost configuration. In addition, detection can be performed using a gravity sensor assuming that an ordinary document is placed horizontally or vertically to the gravity direction. However, as compared to this method, when the method for detecting the angle of photography based on image processing is employed, it is possible to achieve further minimization and low cost of the device.

Further, according to the example of the operation, in the document photographing mode, the data relating to photographing conditions (magnification at the time of photography, and information about the frame type (information for a guidance frame)) is recorded in the recording medium 107 in correspondence with the compressed image data. Therefore, when the image is to be transmitted to an external device (e.g., a facsimile or a personal computer), the image can easily be subjected to any image processing that the destination requires by utilizing this data about photographing conditions.

Operation of transmitting a photographed image to an external device is explained below with reference to FIG. 6. FIG. 6 shows a flow chart of operation when a photographed image is transmitted to an external device.

In FIG. 6, the user first operates the operation section 109 to select the destination and the image to be transmitted (step S200, S201). The system control section 101 reads the selected compressed image data from the recording medium 107 (step S202), and identifies the photographing mode, in which the image is photographed, from the header information of the image. The system control section 101 then determines whether the image has been photographed in the document photographing mode (step S203). When the image has been photographed in any mode other than the document photographing mode, the system control section 101 proceeds to step S207, and the image data is transmitted as it is using the protocol corresponding to the destination.

On the other hand, at step S203, when it is determined that the image has been photographed in the document photographing mode, the system control section 101 reads the file, in which the magnification at the time of photography recorded in photographing and the frame type are recorded, from the recording medium 107 (step S204). The system control section 101 then determines whether the attribute of destination is a facsimile (step S205). When the attribute of destination is a facsimile, the system control section 101 proceeds to step S213, and transmits the read-out compressed image data to the image processing section 103. In response to reception of the data, the image processing section 103 expands the compressed image data and clips the data (step S214). In this clipping, the area determined uniquely based on the previously read-out frame type is clipped and processed (see FIG. 4).

The image processing section 103 then performs the processing for scaling to the image (step S215). At this step, the image processing section 103 changes the size of the image to the closest possible size to the real size of the photographed document using the previously read-out value of magnification at the time of photography. More specifically, when a A4-size document is photographed, the image is scaled so that the image is transmitted as the A4 document. Similarly, when a A3-size document is photographed, the image is scaled so that the image is transmitted as the A3 document. In this case, the resolution of the image is also converted to the resolution defined in the facsimile communications.

Further, the image processing section 103 subjects the data to binarization (step S216). The processing for binarization can be performed by using the method disclosed, for example, in Japanese patent application laid open HEI 08-125870. The image processing section 103 then recompresses the binary-coded image data by the compression method used for facsimile communications (step S217). As the compression method, any method (MH, MR, or MMR), which is determined based on negotiation when communication is started, is used. The system control section 101 transmits the recompressed image data to the facsimile via the communication interface section 110 (step S218), and then the processing is terminated.

At the step S205, on the other hand, when the attribute of destination is not a facsimile, the system control section 101 proceeds to step S206. It is determined whether the attribute of destination is an electronic mail. When the attribute of destination is an electronic mail, the image processing section 103 subjects the compressed image data to expansion, clipping, and binarization (steps S208 to S210) in the same manner as that of facsimile communications. The image processing section 103 then converts the data to a text document based on character recognition (step S211).

The system control section 101 edits the converted text document appropriate as the contents of an electronic mail, sends the email via the communication interface section 110 (step S212), and then ends the processing. At the step S206, when the attribute of destination is not an electronic mail, the image data is transmitted as it is by the protocol in accordance with the destination (step S207).

According to the example of the operation, the image processing section 103 converts the image photographed in the document photographing mode to the data format corresponding to the destination (facsimile or personal computer) selected by the user. Therefore, the image photographed in the document photographing mode can be converted to any format appropriate to the destination, thus it is possible to make effective use of the photographed image.

Further, according to the example of the operation, when the image photographed in the document photographing mode is transmitted to a facsimile, the image processing section 103 first expands the compressed image data stored in the recording medium 107. The image processing section 103 then subjects the data to processing such as clipping, binarization (conversion to a smaller number of gray levels in achromatic color), and resolution conversion, and further recompresses the data in the compression method used for facsimile communications. Therefore, the image can be converted to any image suitable for the facsimile, thus it is possible to make effective use of the photographed image.

Further, according to the example of the operation, when the image photographed in the document photographing mode is sent by an electronic mail, the image processing section 103 first expands the compressed image data stored in the recording medium 107. The image processing section 103 then subjects the data to the processing such as clipping and binarization (conversion to a smaller number of gray levels in achromatic color), and further converts the data to a test document (text data) based on character recognition. Therefore, the data can be converted to any data format suitable for the electronic mail, thus it is possible to make effective use of the photographed image.

Figure 7:
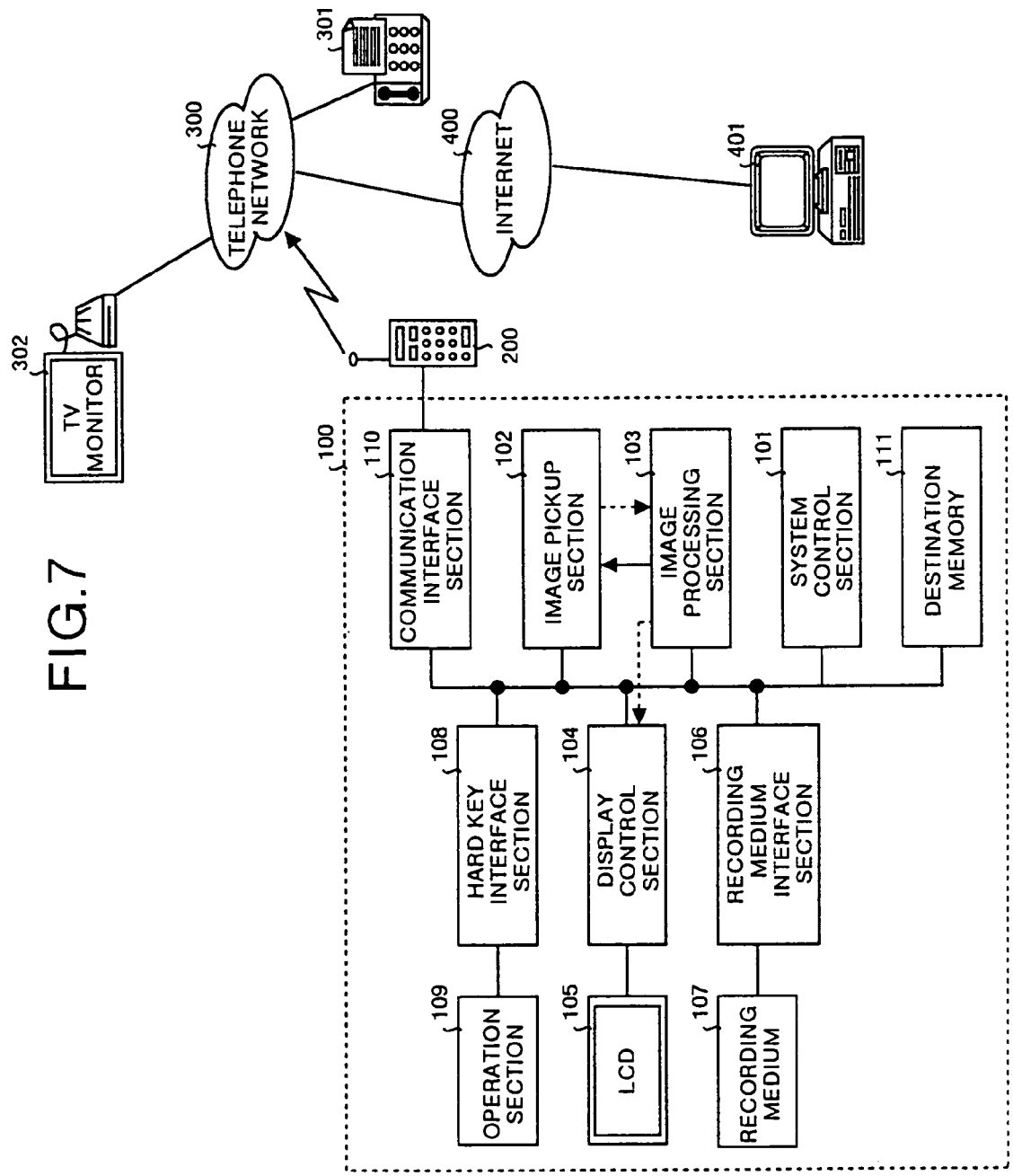
FIG. 7 shows a configuration of a digital camera according to a second embodiment.

A digital camera according to a second embodiment is explained below with reference to FIG. 7 to FIG. 10. FIG. 7 is a block diagram showing a configuration of the digital camera according to the second embodiment. In FIG. 7, the same reference numerals are assigned to the sections that have same or similar functions to those of the digital camera according to the first embodiment shown in FIG. 1. The digital camera according to the second embodiment shown in FIG. 7 has a destination memory 111 in addition to the components of the digital camera according to the first embodiment. The other parts of the configuration are the same as those in first embodiment, therefore, explanation of these parts is omitted. Only different points are explained below.

FIG. 8 shows an example of the data structure of the destination memory 111. This destination memory 111 is a nonvolatile memory, which manages information about destination to which the image data is to be transmitted. The destination memory 111 stores information, as shown in FIG. 8, such as name of destination, type of destination, telephone number, mail address, guidance-frame display information, document size, and image deletion flag in correspondence with one another.

The guidance-frame display information is used to instruct whether a regular-size frame is to be displayed on the LCD 105 based on a document size, which helps the person photograph a subject in the document photographing mode. When guidance-frame display information is "1", the guidance frame is displayed, and when guidance-frame display information is "0", the guidance frame is not displayed. Document size is used to determine the size of a guidance frame when it is displayed. An image deletion flag is used to instruct whether the transmitted image data is to be deleted when an operator transmits the image data stored in the recording medium 107 to the selected destination. When the image deletion flag is "1", the transmitted image data is deleted, and when the image deletion flag is "0", the transmitted image data is not deleted and stored as it is. The contents of the data in the memory for destinations 111 is displayable on the LCD 105, therefore, the operator can store the data in the memory on the LCD 105 through the operation section.

Figure 9:
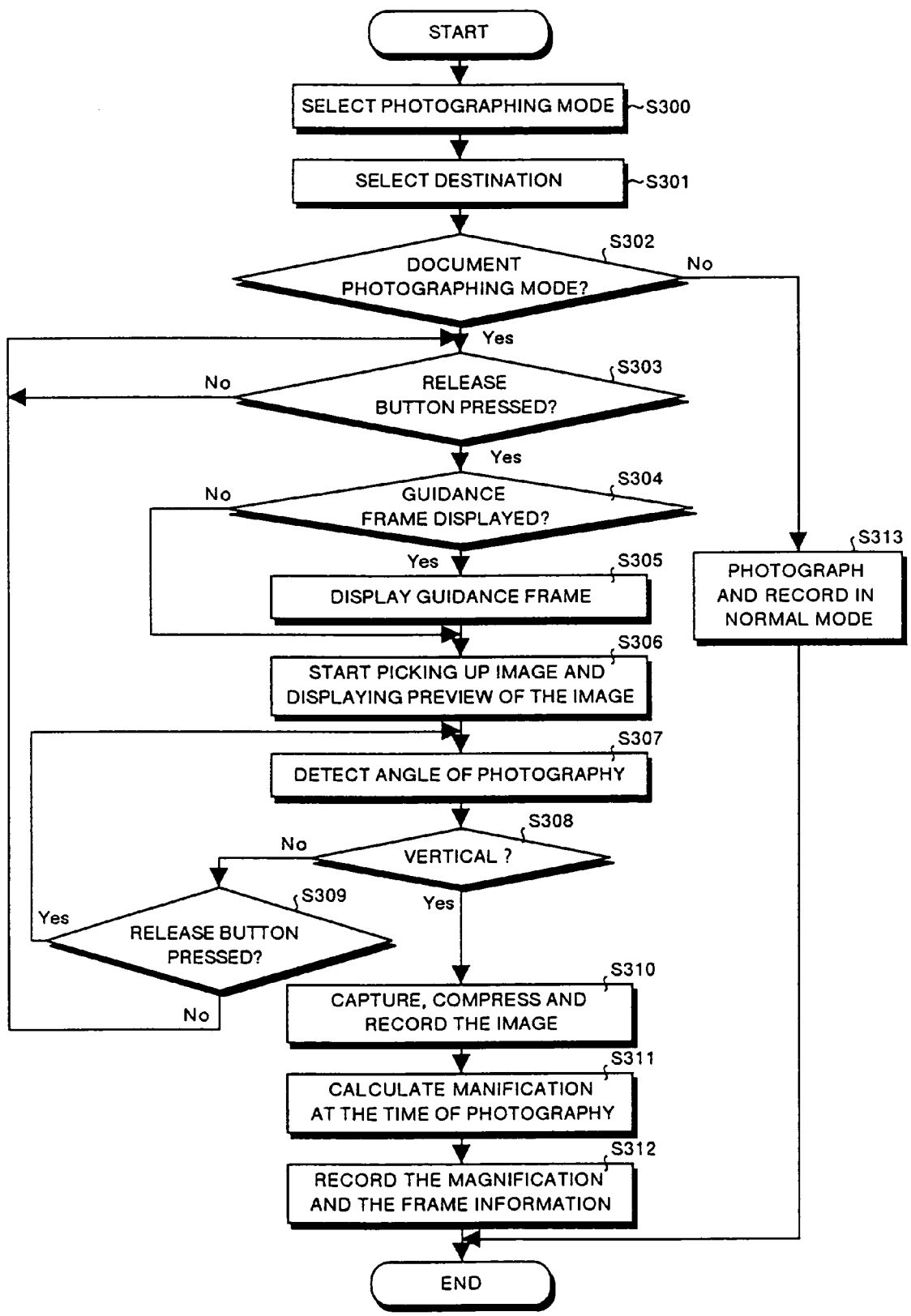
FIG. 9 shows a flow chart of photographing operation when the document photographing mode is selected in the second embodiment.

FIG. 9 shows a flow chart of photographing operation in the second embodiment. In FIG. 9, the operator selects a photographing mode through the operation section 109 (step S300), and selects a destination from the destinations stored in the destination memory 111 (step S301).

The system control section 101 identifies the current photographing mode (step S302). When the current mode is not the document photographing mode but the normal photographing mode, the system control section 101 proceeds to step S313, and carries out normal photographing and recording.

On the other hand, when it is determined, at step S303, that the current mode is the document photographing mode, the system control section 101 monitors the information regarding the keys from the hard key interface section 108. When it is determined that the release button has been pressed (step S303), the system control section 101 determines whether the guidance frame display has been specified by referring to the guidance-frame display information corresponding to the selected destination in the destination memory 111 (step S304). When the guidance frame display has not been specified, the system control section 101 proceeds to step S306.

At step S304, when the guidance frame display has been specified, the system control section 101 displays the guidance frame as shown in FIG. 4 (step S305), and starts picking up an image and displaying the preview of the image through the previously explained steps (step S306). The example of display of the guidance frame is the same as shown in FIG. 4.

Since the guidance frame is displayed in the same manner as that in the first embodiment, explanation of the display is omitted. The frame to be displayed here is displayed according to the regular aspect ratio of a document size corresponding to the destination stored in the memory for destinations 111.

The system control section 101 sets the operation of detecting the angle of photography in the image processing section 103, whereas the image processing section 103 detects the angle of photography in response to the setting. The system control section 101 then reads the detected angle of photography (step S307). Further, the system control section 101 determines whether the angle of photography is vertical to the document (step S308). The method of detecting the angle of photography is the same as that in the first embodiment (see FIG. 5), therefore, explanation of the method is omitted.

At step S308, on the other hand, when it is determined that the angle of photography is not vertical, the system control section 101 proceeds to step S309, and determines whether the release button has been pressed. When the release button has not been pressed, the system control section 101 returns to step S303. When the release button has been pressed, on the other hand, the system control section 101 notifies the operator of a message to the effect that the angle of photography is not vertical (guidance display or the like is performed). The angle of photography is then detected again (step S307).

At step S308, when it is determined that the angle of photography is vertical, the system control section 101 allows the image pickup section 102 to capture the image and also the image processing section 103 to compress the captured image in the same manner as that when the release button has been pressed in the normal photographing mode. Further, the system control section 101 records the compressed data in the recording medium 107 via the recording medium interface section 106 (step S310).

The system control section 101 reads the lens-to-subject distance (the distance from the digital camera to the document) detected during focusing at the time of photographing, from the image processing section 103. The system control section 101 then calculates the magnification at the time of photography (a focal length of a lens/a lens-to-subject distance) (step S311), and records the magnification in the recording medium 107 in correlation with the photographed image together with the information for the frame type (step S312). When the guidance frame has not been displayed at step S304, the frame information is not recorded. For example, when Taro Yamada is selected as the destination, it is understood that the guidance-frame display information is "1" and the document size is A4 in the memory destination memory 111 in FIG. 8. Therefore, the A4-size guidance frame is displayed.

In the second embodiment as explained above, the guidance-frame display information, to specify presence or absence of the guidance frame display, is stored in the destination memory 111 in correspondence with each destination. The system control section 101 refers to this destination memory 111 when the document photographing mode is selected, and displays or does not display the guidance frame according to the guidance-frame display information corresponding to the selected destination. Therefore, the guidance frame may be displayed or may not be displayed depending on the destination, thus the usability of the digital camera for the operator can be improved.

Further, in the second embodiment, the system control section 101 determines whether the guidance frame is to be displayed according to the frame display information stored in the destination memory 111. However, whether or not the guidance frame is displayed may be automatically determined according to the attribute of the destination. When the type of destination is a printer, for example, it is required to match the image with the paper size such as A4 size, therefore, the guidance frame is displayed. When the destination is a computer, on the other hand, it is not required to match the image with the paper size, therefore, the guidance frame need not be displayed.

Figure 10:
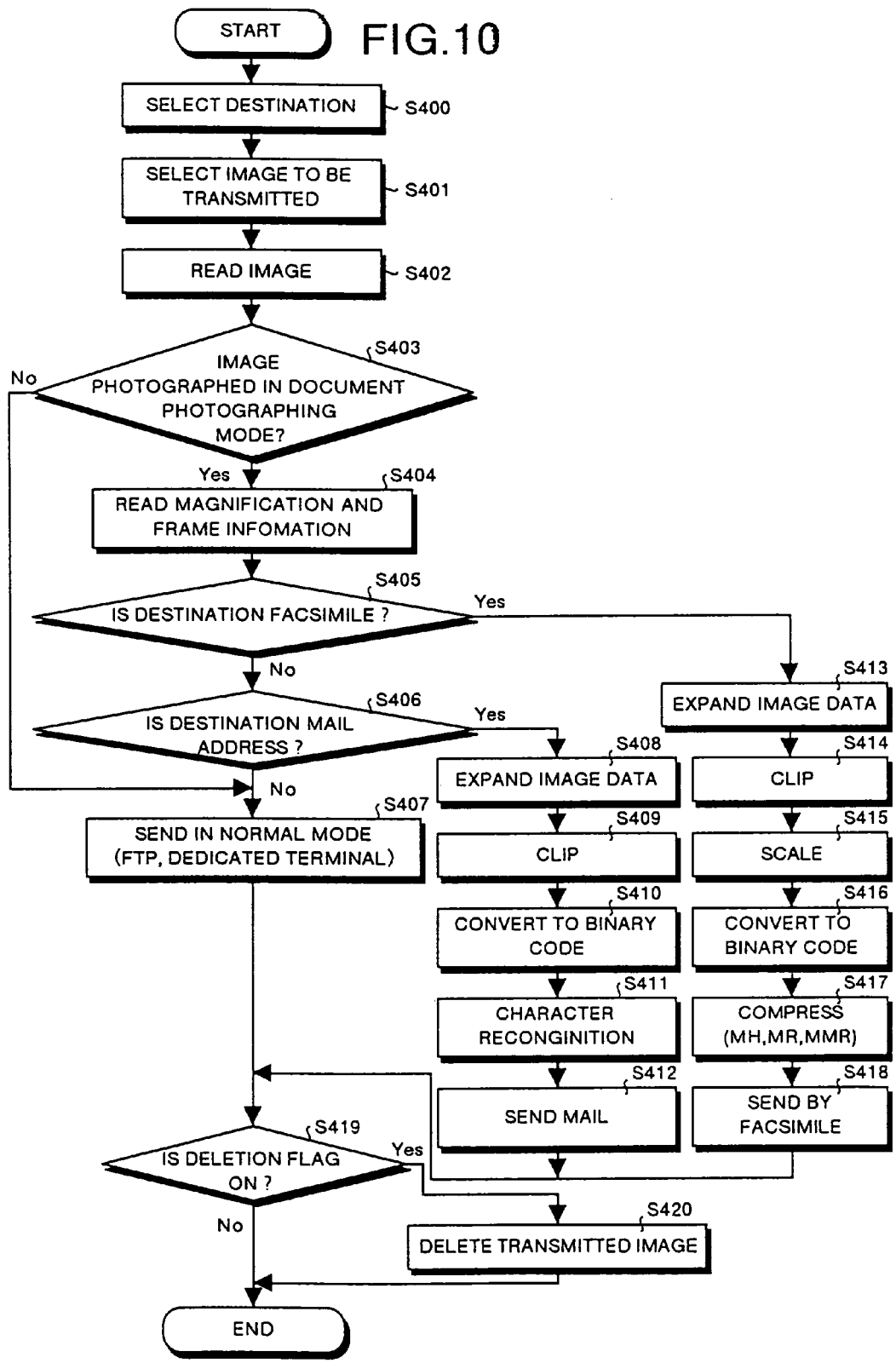
FIG. 10 shows a flow chart of operation when a photographed image is transmitted to an external device in the second embodiment.

Operation for communications in the second embodiment is explained below. FIG. 10 shows a flow chart of operation for communications in the second embodiment.

In FIG. 10, the user first selects a destination stored in the destination memory 111 (step S400), and further selects an image to be transmitted (step S401). The system control section 101, in response to the selections, reads the selected image data from the recording medium 107 (step S402), and identifies the photographing mode used when the image is photographed from the header information of the image. The system control section 101 then determines whether the image has been photographed in the document photographing mode (step S403). When the image has been photographed in any mode other than the document photographing mode, the system control section 101 proceeds to step S407, and transmits the image data as it is to the destination using the protocol corresponding to the destination via the communication interface section 110.

On the other hand, at step S403, when the image has been photographed in the document photographing mode, the system control section 101 reads a file, where the magnification at the time of photography recorded in photographing and the frame type are recorded, from the recording medium 107 (step S404). However, when the guidance frame has not been displayed, the frame type is not recorded. The system control section 101 then determines whether the attribute of destination is a facsimile (step S405). When the attribute of destination is a facsimile, the system control section 101 proceeds to step S413, and transmits the read-out image data to the image processing section 103. In response to reception of the data, the image processing section 103 expands the compressed image data, and then performs clipping to the data (step S414). In this clipping, the area determined uniquely based on the previously read-out frame type is clipped and processed. When the frame type has not been recorded, however, the clipping is not executed.

The image processing section 103 then performs the processing for scaling to the image (step S415). For example, the image processing section 103 changes the size of the image to the closest possible size to the real size of the photographed document using the value of the previously read-out magnification at the time of photography. More specifically, when a A4 document is photographed, the image is scaled so that the image is transmitted as the A4 document. Similarly, when a A3 document is photographed, the image is scaled so that the image is transmitted as the A3 document. In this case, the resolution of the image is also converted to the resolution defined in the facsimile communications.

Further, the image processing section 103 subjects the data to binarization (step S416). The processing for binarization can be performed by using the method disclosed, for example, in Japanese patent application laid open No. HEI 06-256907. The image processing section 103 then recompresses the binary-coded image data by the compression method used for facsimile communications (step S417). As the compression method, any method (MH, MR, or MMR), which is determined based on negotiation when communication is started, is used. The system control section 101 transmits the recompressed image data to the facsimile via the communication interface section 110 (step S418), and then the processing is completed.

On the other hand, at the step S405, when the attribute of destination is not a facsimile, the system control section 101 proceeds to step S406, and determines whether the attribute of destination is an electronic mail. When it is determined that the attribute of destination is an electronic mail, the image processing section 103 subjects the image data to expansion, clipping, and binarization (steps S408 to S410) in the same manner as that of facsimile communications. When the frame type information has not been recorded, however, the clipping is not carried out.

The image processing section 103 then converts the data to a text document based on character recognition (step S411). The system control section 101 edits the converted text document appropriate as the contents of an electronic mail, sends the email via the communication interface section 110 (step S412), and then ends the processing.

At the step S406, when the attribute of the destination is not an electronic mail, the image data is transmitted as it is using the protocol in accordance with the destination (step S407).

The system control section 101 determines whether the image deletion flag corresponding to the destination is set to "1" by referring to the destination memory 111 (step S419). When the image deletion flag corresponding to the destination has been set to "1", the system control section 101 deletes the image file, which has been transmitted, stored in the recording medium 107 (step S420). On the other hand, when the image deletion flag is "0", the image file which has been transmitted is not deleted and stored as it is. The processing is completed with the step. For example, when Taro Yamada is selected as destination, it is understood that the image deletion flag is "1" in the destination memory 111 in FIG. 8. Therefore, the transmitted image file is deleted.

In the second embodiment as explained above, the image deletion flag, to specify whether the transmitted image file is to be deleted, is stored in the destination memory 111 in correspondence with each destination. The system control section 101 refers to the destination memory 111 when the document photographing mode is selected, and deletes the transmitted image file based on the image deletion flag corresponding to the selected destination. Therefore, deletion or non-deletion of the transmitted image can be selected depending on the destination, thus the usability of the digital camera for the operator can be improved.

Further, in the second embodiment, the system control section 101 determines whether the transmitted image file is to be deleted based on the image deletion flag corresponding to the destination stored in the destination memory 111. However, whether or not the image file is deleted may be automatically determined according to the destination. When the destination is a FAX, for example, the FAX sends back a response message about successful reception. Therefore, there will occur no problem even if the image is deleted. Thus, the transmitted image file is deleted. When the destination is a computer, on the other hand, the computer does not send back a response message about successful reception. Therefore, if any image, which may not have been properly received by the computer, is deleted, there may come up a problem that the image is lost. Therefore, the transmitted image file is not deleted to be on the safe side.

A digital camera according to a third embodiment is explained below with reference to FIG. 11 and FIG. 12. This digital camera of the third embodiment has the same configuration as that of the first embodiment. However, the digital camera (system control section 101) of the third embodiment has a photographing/transmission mode in which a photographed image is instantly transmitted to a specified destination.

When photographing an image in the document photographing mode and instantly transmitting the image to the outside, the user selects, by operating the operation section 109, the photographing/transmission mode, and also selects the document photographing mode with the photographing mode key. The user also selects a regular document size (A size, letter, or legal size) of an image to be captured with the regular document size setting key, and further selects the destination.

Figure 11:
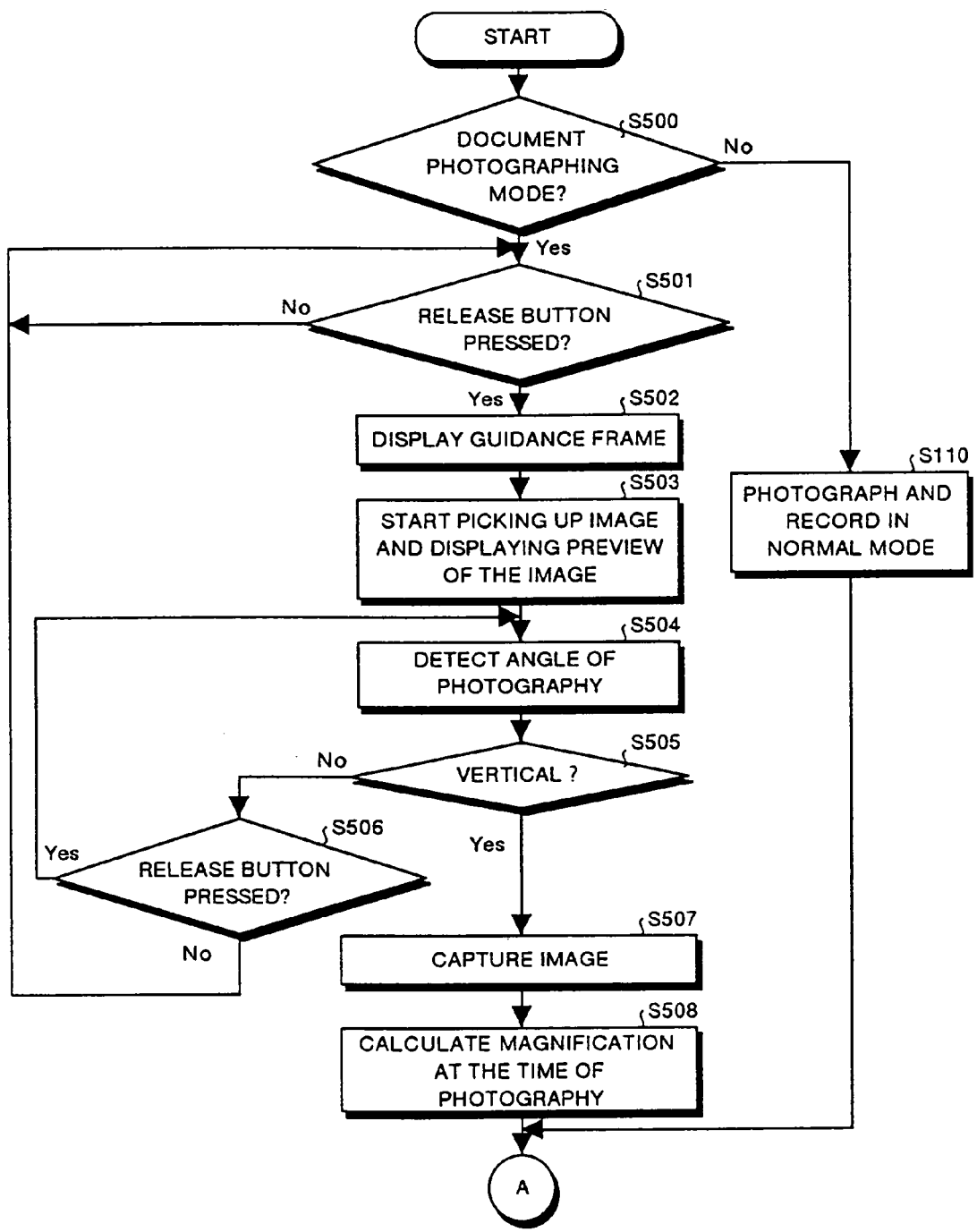
FIG. 11 shows a flow chart of operation when the document photographing/transmission mode is selected in a third embodiment.

As shown in FIG. 11, the system control section 101 first identifies the current photographing mode (step S500). When the current mode is the normal photographing mode, the system control section 101 proceeds to step S110, and carries out normal photographing and recording.

On the other hand, when it is determined, at step S500, that the current mode is the document photographing mode, the system control section 101 monitors the information regarding the pressed keys from the hard key interface section 108. When it is determined that the release button has been pressed (step S501), the system control section 101 displays the guidance frame on the LCD 105 as shown in FIG. 4 (step S502). The system control section 101 then starts picking up a document image and displays the preview of the image (the subject is displayed on the monitor) (step S503). The example of the display of the guidance frame is the same as that of the first embodiment (FIG. 4).

The system control section 101 issues an instruction to detect an angle of photography to the image processing section 103. In response to reception of the instruction, the image processing section 103 detects the angle of photography to the subject, and the system control section 101 reads the detected angle of photography (step S504). The system control section 101 then determines whether the angle of photography is vertical (step S505). The method of detecting the angle of photography is the same as that of the first embodiment (see FIG. 5), therefore, explanation of the method is omitted.

On the other hand, at step S505, when it is determined that the angle of photography is not vertical, the system control section 101 proceeds to step S506, and determines whether the release button has been pressed. When the release button has not been pressed, the system control section 101 returns to step S501. When the release button has been pressed, on the other hand, the system control section 101 notifies the operator of, for example, the fact that the angle of photography is not vertical (e.g., using the guidance display), and detects again the angle of photography (step S504).

When it is determined, at step S505, that the angle of photography is vertical, the system control section 101 allows the image pickup section 102 to capture an image in the same manner as that in the case where the release button has been pressed in normal photographing mode (step S507). The system control section 101 then reads the lens-to-subject distance (the distance from the digital camera 100 to the document), detected during focusing at the time of photography, from the image processing section 103. The system control section 101 further calculates the magnification at the time of photography (a focal length of a lens/a lens-to-subject distance) (step S508).

Figure 12:
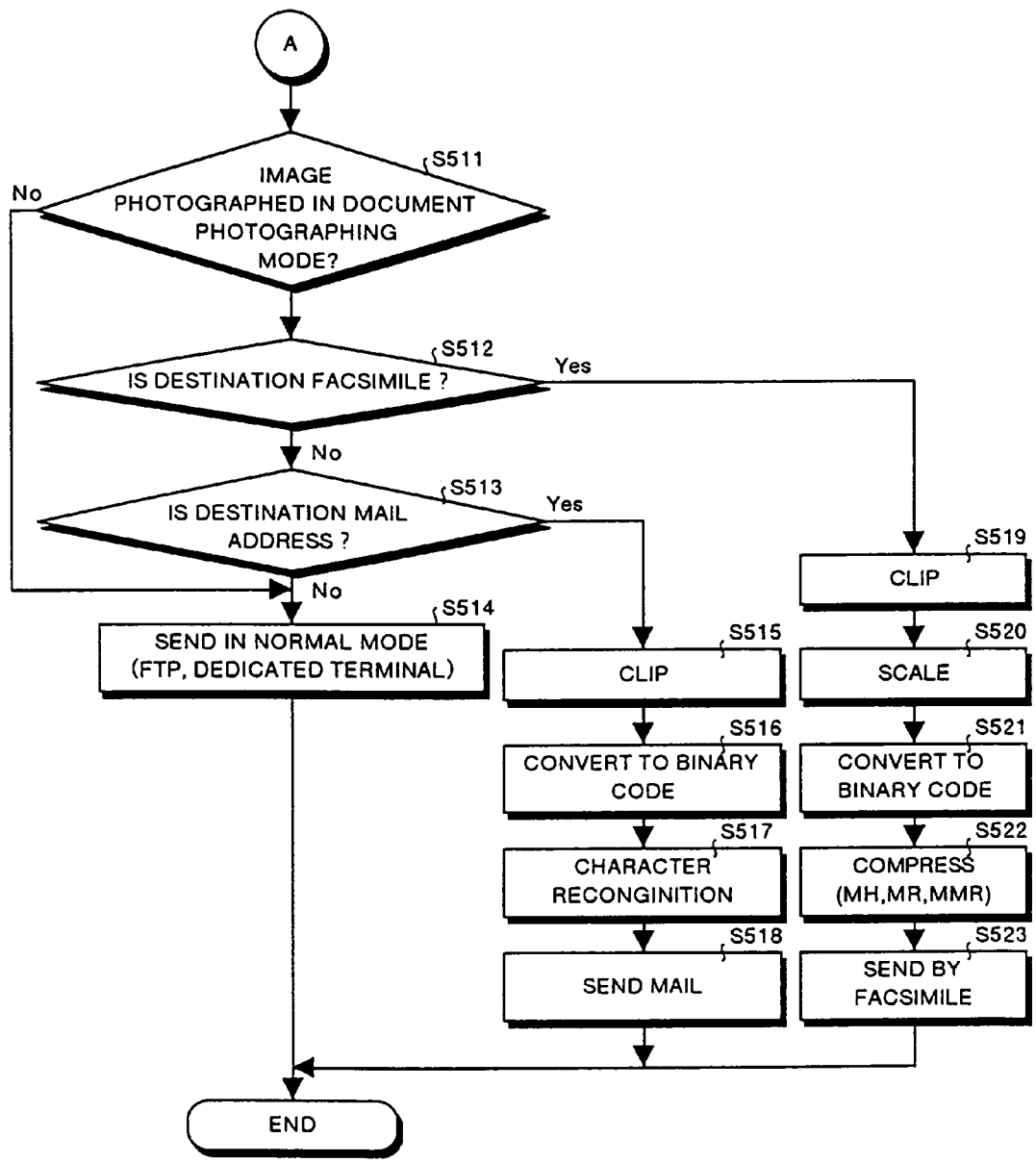
FIG. 12 is the continuation of the flow chart of FIG. 11.

As shown in FIG. 12, the system control section 101 the determines whether the image has been photographed in the document photographing mode (step S511). When the image has been photographed in any mode other than the document photographing mode, the system control section 101 proceeds to step S514, and the image data is transmitted as it is via the communication interface section 110 using the protocol corresponding to the destination.

At step S511, on the other hand, when it is determined that the image has been photographed in the document photographing mode, the system control section 101 determines whether the attribute of the destination is a facsimile (step S512). When the attribute of the destination is a facsimile, the system control section 101 proceeds to step S519, and performs clipping to the image. In this clipping, the area determined uniquely based on the frame type is clipped and processed.

The image processing section 103 then performs the processing for scaling to the image (step S520). For example, the image processing section 103 changes the size of the image to the closest possible size to the real size of the photographed document using the value of the magnification at the time of photography. More specifically, when a A4-size document is photographed, the image is scaled so that the image is transmitted as a A4 document. Similarly, when a A3-size document is photographed, the image is scaled so that the image is transmitted as a A3 document. In this case, the resolution of the image is also converted to the resolution defined in the facsimile communications.

Further, the image processing section 103 subjects the data to binarization (step S521). The processing for binarization can be performed by using the method disclosed, for example, in Japanese patent application laid open No. HEI 08-125870. The image processing section 103 then recompresses the binary-coded image data by the compression method used for facsimile communications (step S522). As the compression method, any method (MH, MR, or MMR), which is determined based on negotiation when communication is started, is used. The system control section 101 transmits the recompressed image data to the facsimile via the communication interface section 110 (step S523), and then the processing is completed.

At the step S512, on the other hand, when it is determined that the attribute of the destination is not the facsimile, the system control section 101 proceeds to step S513, and determines whether the attribute of the destination is an electronic mail. When the attribute of destination is the electronic mail, the image processing section 103 subjects the image data to clipping and binarization (steps S515 and S516) in the same manner as that of facsimile communications. The image processing section 103 then converts the data to a text document based on character recognition (step S517).

The system control section 101 edits the converted text document appropriate as the contents of an electronic mail, sends the email via the communication interface section 110 (step S518), and then ends the process. At the step S513, when it is determined that the attribute of the destination is not an electronic mail, the image data is transmitted as it is by the protocol in accordance with the destination (step S514).

As explained above, in the third embodiment, the document photographing/transmission mode in which a photographed image is instantly transmitted is provided. Therefore, it is possible to transmit a photographed image at once to the desired destination, thus, the usability of the digital camera for the operator can be improved.

In this third embodiment, the destination memory 111 (see FIG. 8) may be provided like in the second embodiment. Accordingly, the guidance frame may or may not be displayed depending on the destination based on the guidance-frame display information corresponding to the destination in the destination memory 111. In addition, display or non-display of the guidance frame may automatically be selected according to the attribute of destination.

Further, in this third embodiment, the destination memory 111 (see FIG. 8) may be provided like the second embodiment. Accordingly, the transmitted image file may be deleted based on the image deletion flag corresponding to a destination in the destination memory 111. In addition, the transmitted image file may automatically be deleted according to the attribute of destination.

It should be understood that this invention is not limited by the embodiments and the appended claims are to be construed as embodying all modifications and alternative constructions that may occur to one skilled in the art which fairly fall within the basic teaching herein set forth.

According to one aspect of this invention, the expansion unit expands compressed image data photographed in the document photographing mode and stored in the storage unit. The image processing unit then subjects the data to any image processing that a destination requires. Therefore, the image photographed in the document photographing mode can be converted to any format suitable for the destination, thus it is possible to make effective use of the photographed image.

According to another aspect of this invention, the image processing unit subjects the image data photographed in the document photographing mode to any image processing that a destination requires. Therefore, the image photographed in the document photographing mode can be converted to any format suitable for the destination, thus it is possible to make effective use of the photographed image.

According to still another aspect of this invention, the expansion unit expands compressed image data photographed in the document photographing mode and stored in the storage unit. The image processing unit then subjects the data to the processing such as clipping, conversion to a smaller number of gray levels in achromatic color, and resolution conversion, and further recompresses the processed data. Therefore, the image photographed in the document photographing mode can be converted to any format suitable for a destination (e.g., a facsimile), thus it is possible to make effective use of the photographed image.

According to still another aspect of this invention, the image processing unit subjects the image data photographed in the document photographing mode to the processing such as clipping, conversion to a smaller number of gray levels in achromatic color, and resolution conversion, and further performs compression to the processed data. Therefore, the image photographed in the document photographing mode can be converted to any format suitable for a destination (e.g., a facsimile), thus it is possible to make effective use of the photographed image.

According to still another aspect of this invention, the expansion unit expands the compressed image data photographed in the document photographing mode and stored in the storage unit. The image processing unit then subjects the image data to the processing such as clipping, and conversion to a smaller number of gray levels in achromatic color, and further performs data processing based on character recognition. Therefore, the image photographed in the document photographing mode can be converted to any format suitable for a destination (e.g., a facsimile), thus it is possible to make effective use of the photographed image.

According to still another aspect of this invention, the image processing unit subjects the image data photographed in the document photographing mode to the processing such as clipping, and conversion to a smaller number of gray levels in achromatic color, and further performs data processing based on character recognition. Therefore, the image photographed in the document photographing mode can be converted to any format (e.g., a text document) suitable for a destination, thus it is possible to make effective use of the photographed image.

Further, the data for photographing conditions is stored in the storage unit in correlation with the compressed image data. Whereas the image processing unit subjects the image data to image processing based on the data for photographing conditions. Therefore, in addition to the above explained effect due to the invention, it is possible to easily subject the data to any image processing that a destination requires by utilizing this data for photographing conditions.

Further, the data communication unit which performs data communications with the outside is provided. Therefore, in addition to the above explained effect due to the invention, it is possible to perform data communications with the outside.

Further, the names of destinations, telephone numbers or addresses, and an image deletion flag that specifies whether image data is to be deleted after its transmission are stored in the memory in correlation with one another. Whereas the deletion unit deletes the image data transmitted via the data communication unit based on the image deletion flag in the memory. Therefore, in addition to the effect due to the invention, the transmitted image may or may not be deleted depending on the destination, thus the usability of the digital camera for the operator can be improved.

Further, the deletion unit deletes the image data transmitted via the data communication unit depending on the destination. Therefore, in addition to the effect due to the invention, the transmitted image may or may not be deleted depending on the destination, thus the usability of the digital camera for the operator can be improved.

According to still another aspect of this invention, in the document photographing mode, the display unit displays the guidance to notify a user of photographing conditions of a document during displaying of the picture of the subject on the monitor before it is photographed. Therefore, the user can fix the location of the document, thus the usability of the digital camera for the operator can be improved.

Further, the guidance display is provided with a frame display with which the user can recognize the area of regular-size paper. Therefore, in addition to the effect due to the invention, the user can fix the location of the document based on the regular-size paper, thus the usability of the digital camera for the operator can further be improved.

According to still another aspect of this invention, the angle of photography detection unit that detects the angle of photography is provided. In the document photographing mode, photographing is started when the angle of photography is substantially vertical to a subject. Therefore, the document can be photographed at the correct angle, thus the usability of the digital camera for the operator can be improved.

Further, the angle of photography detection unit recognizes the shape of the photographed subject and detects the angle of photography. Therefore, in addition to the effect due to the invention, it is possible to detect the correct angle of photography no matter how the document to be photographed is placed. Thus, it is possible to detect the angle of photography with a simple and low-cost configuration.

Further, the names of destinations, telephone numbers or addresses, and frame display information that specifies whether the guidance is to be displayed on photographing are stored in the memory in correlation with one another.

Whereas, the display control unit provides controls for displaying or not displaying the guidance based on the frame display information in the memory. Therefore, in addition to the effect due to the invention, it is possible to select between display and non-display of the guidance depending on the destination. Thus the usability of the digital camera for the operator can be improved.

Further, the display control unit provides controls for displaying or not displaying the guidance onto the display unit depending on a destination. Therefore, in addition to the effect due to the invention, it is possible to select between display and non-display of the guidance depending on the destination. Thus the usability of the digital camera for the operator can be improved.

Further, the operator can freely add or change the contents of the memory. Therefore, in addition to the effect due to the invention, the usability of the digital camera for the operator can further be improved.

According to still another aspect of this invention, there are provided the steps of monitoring a subject on the display unit in response to instructions for monitoring, displaying guidance on the display unit when the monitoring is performed, capturing an image and compressing the image data in response to instructions for photographing, storing the compressed image data in a storage unit, reading the compressed image data stored in the storage unit and expanding the data in response to instructions for transmission, subjecting the expanded image data to any image processing that a destination requires, and transmitting the image data, that has been subjected to image processing, to the destination. Therefore, the image can be converted to any format suitable for the destination, thus it is possible to make effective use of the photographed image.

According to still another aspect of this invention, there are provided the steps of monitoring a subject on the display unit in response to instructions for monitoring, displaying guidance on the display unit when the monitoring is performed, capturing an image in response to instructions for photographing, subjecting the data of the captured image to any image processing that a destination requires, and transmitting the image data, that has been subjected to image processing, to the destination. Therefore, the image can be converted to any format suitable for the destination and immediately be transmitted, thus it is possible to make effective use of the photographed image.

The present document incorporated by reference the entire contents of Japanese priority documents, HEI 11-090224 filed in Japan on Mar. 30, 1999 and 2000-12217 filed in Japan on Jan. 20, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera having a normal photographing mode and a document photographing mode, said digital camera comprising:
    an image pickup unit which captures an image of a subject and converts the image to image data;
    an angle of photography detection unit which detects an angle of photography with respect to a surface of a document as the subject in the document photographing mode and prevents capturing the image until a suitable angle of photography is detected in order to minimize distortions in the image captured of the document;
    a compression unit which compresses the image data and generates a compressed image data;
    a storage unit which stores the compressed image data;
    an expansion unit which expands the compressed image data;
    a selection unit with which any of the normal photographing mode and the document photographing mode can be selected, and with which a destination to receive the image data can be selected; and
    an image processing unit which subjects the image data to image processing depending on the selected photographing mode,
    wherein said expansion unit expands the compressed image data acquired in the document photographing mode and stored in said storage unit, and then said image processing unit subjects this data to an image processing that a selected destination requires, prior to providing the image data to the destination.

2. The digital camera according to claim 1, wherein, in the document photographing mode, data related to the conditions during photography are stored in said storage unit in correlation with the compressed image data, and said image processing unit subjects the image data to image processing based on the data related to the conditions during photography.

3. The digital camera according to claim 1 further comprising a data communication unit which performs data communications with the outside.

4. The digital camera according to claim 3 further comprising:
    a memory which stores the names of destinations, telephone numbers or addresses, and an image deletion flag that specifies whether the image data is to be deleted after its transmission in correlation with one another; and
    a deletion unit which deletes the image data after the image data has been transmitted by said data communication unit based on the image deletion flag in said memory.

5. The digital camera according to claim 3 further comprising a deletion unit which deletes the image data after the image data has been transmitted by said data communication unit depending on the selected destination.

6. The digital camera according to claim 4, wherein an operator can freely add or change the contents of said memory.

7. A digital camera having a normal photographing mode and a document photographing mode, said digital camera comprising:
    an image pickup unit which captures an image of a subject and converts the image to image data;
    an angle of photography detection unit which detects an angle of photography with respect to a surface of a document as the subject in the document photographing mode and prevents capturing the image until a suitable angle of photography is detected in order to minimize distortions in the image captured of the document;
    a selection unit with which any of the normal photographing mode and the document photographing mode can be selected, and with which a destination to receive the image data can be selected;
    an image processing unit which subjects the image data acquired in the document photographing mode to an image processing that a selected destination requires, prior to providing the image data to the destination.

8. The digital camera according to claim 7 further comprising a data communication unit which performs data communications with the outside.

9. The digital camera according to claim 8 further comprising:
- a memory which stores the names of destinations, telephone numbers or addresses, and an image deletion flag that specifies whether the image data is to be deleted after its transmission in correlation with one another; and
- a deletion unit which deletes the image data after the image data has been transmitted by said data communication unit based on the image deletion flag in said memory.

10. The digital camera according to claim 8 further comprising a deletion unit which deletes the image data after the image data has been transmitted by said data communication unit depending on the selected destination.

11. The digital camera according to claim 9, wherein an operator can freely add or change the contents of said memory.

12. A digital camera having a normal photographing mode and a document photographing mode, said digital camera comprising:
- an image pickup unit which captures an image of a subject and converts the image to image data;
- an angle of photography detection unit which detects an angle of photography with respect to a surface of a document as the subject in the document photographing mode and prevents capturing the image until a suitable angle of photography is detected in order to minimize distortions in the image captured of the document;
- a compression unit which compresses the image data and generates a compressed image data;
- a storage unit which stores the compressed image data;
- an expansion unit which expands the compressed image data;
- a selection unit with which any of the normal photographing mode and the document photographing mode can be selected, and with which a destination to receive the image data can be selected; and
- an image processing unit which subjects the expanded image data to image processing depending on the selected photographing mode,
- wherein, based on a selected destination, said expansion unit expands the compressed image data acquired in the document photographing mode and stored in said storage unit, and then said image processing unit subjects the data to the processing for clipping, conversion to a smaller number of gray levels in achromatic color, and resolution conversion, and once more compresses the data, prior to providing the image data to the destination.

13. The digital camera according to claim 12, wherein, in the document photographing mode, data related to the conditions during photography are stored in said storage unit in correlation with the compressed image data, and said image processing unit subjects the image data to image processing based on the data related to the conditions during photography.

14. The digital camera according to claim 12 further comprising a data communication unit which performs data communications with the outside.

15. The digital camera according to claim 14 further comprising:
- a memory which stores the names of destinations, telephone numbers or addresses, and an image deletion flag that specifies whether the image data is to be deleted after its transmission in correlation with one another; and
- a deletion unit which deletes the image data after the image data has been transmitted by said data communication unit based on the image deletion flag in said memory.

16. The digital camera according to claim 14 further comprising a deletion unit which deletes the image data after the image data has been transmitted by said data communication unit depending on the selected destination.

17. The digital camera according to claim 15 wherein an operator can freely add or change the contents of said memory.

18. A digital camera having a normal photographing mode and a document photographing mode, said digital camera comprising:
- an image pickup unit which captures an image of a subject and converts the image to image data;
- an angle of photography detection unit which detects an angle of photography with respect to a surface of a document as the subject in the document photographing mode and prevents capturing the image until a suitable angle of photography is detected in order to minimize distortions in the image captured of the document;
- a selection unit with which any of the normal photographing mode and the document photographing mode can be selected, and with which a destination to receive the image data can be selected; and
- an image processing unit which, based on the selected destination, subjects the image data acquired in the document photographing mode to the processing for clipping, conversion to a smaller number of gray levels in achromatic color, and resolution conversion, and once more compresses the data, prior to providing the image data to the destination.

19. The digital camera according to claim 18 further comprising a data communication unit which performs data communications with the outside.

20. The digital camera according to claim 19 further comprising:
- a memory which stores the names of destinations, telephone numbers or addresses, and an image deletion flag that specifies whether the image data is to be deleted after its transmission in correlation with one another; and
- a deletion unit which deletes the image data after the image data has been transmitted by said data communication unit based on the image deletion flag in said memory.

21. The digital camera according to claim 19 further comprising a deletion unit which deletes the image data after the image data has been transmitted by said data communication unit depending on the selected destination.

22. The digital camera according to claim 20, wherein an operator can freely add or change the contents of said memory.

23. A digital camera having a normal photographing mode and a document photographing mode, said digital camera comprising:
- an image pickup unit which captures an image of a subject and converts the image to image data;

an angle of photography detection unit which detects an angle of photography with respect to a surface of a document as the subject in the document photographing mode and prevents capturing the image until a suitable angle of photography is detected in order to minimize distortions in the image captured of the document;

a compression unit which compresses the image data and generates a compressed image data a storage unit which stores the compressed image data;

an expansion unit which expands the compressed image data;

a selection unit with which any of the normal photographing mode and the document photographing mode can be selected, and with which a destination to receive the image data can be selected; and an image processing unit which subjects the image data to image processing depending on the selected photographing mode, wherein, based on the selected destination, said expansion unit expands the compressed image data acquired in the document photographing mode and stored in said storage unit, and then said image processing unit subjects this data to the processing for clipping, conversion to a smaller number of gray levels in achromatic color, and once more compresses the data, prior to providing the image data to the destination.

24. The digital camera according to claim 23, wherein, in the document photographing mode, data related to the conditions during photography are stored in said storage unit in correlation with the compressed image data, and said image processing unit subjects the image data to image processing based on the data related to the conditions during photography.

25. The digital camera according to claim 23 further comprising a data communication unit which performs data communications with the outside.

26. The digital camera according to claim 25 further comprising:

a memory which stores the names of destinations, telephone numbers or addresses, and an image deletion flag that specifies whether the image data is to be deleted after its transmission in correlation with one another; and a deletion unit which deletes the image data after the image data has been transmitted by said data communication unit based on the image deletion flag in said memory.

27. The digital camera according to claim 25 further comprising a deletion unit which deletes the image data after the image data has been transmitted by said data communication unit depending on the selected destination.

28. The digital camera according to claim 26, wherein an operator can freely add or change the contents of said memory.

29. A digital camera having a normal photographing mode and a document photographing mode, said digital camera comprising:

an image pickup unit which captures an image of a subject and converts the image to image data;

an angle of photography detection unit which detects an angle of photography with respect to a surface of a document as the subject in the document photographing mode and prevents capturing the image until a suitable angle of photography is detected in order to minimize distortions in the image captured of the document;

a selection unit with which any of the normal photographing mode and the document photographing mode can be selected, and with which a destination to receive the image data can be selected; and an image processing unit which, based on the selected destination, subjects the image data acquired in the document photographing mode to the processing for clipping, conversion to a smaller number of gray levels in achromatic color, and character recognition, prior to providing the image data to the destination.

30. The digital camera according to claim 29 further comprising a data communication unit which performs data communications with the outside.

31. The digital camera according to claim 30 further comprising:

a memory which stores the names of destinations, telephone numbers or addresses, and an image deletion flag that specifies whether the image data is to be deleted after its transmission in correlation with one another; and a deletion unit which deletes the image data after the image data has been transmitted by said data communication unit based on the image deletion flag in said memory.

32. The digital camera according to claim 30 further comprising a deletion unit which deletes the image data after the image data has been transmitted by said data communication unit depending on a destination.

33. The digital camera according to claim 31, wherein an operator can freely add or change the contents of said memory.

34. A digital camera having a normal photographing mode and a document photographing mode, said digital camera comprising:

an image pickup unit which captures an image of a subject and converts the image to image data;

an angle of photography detection unit which detects an angle of photography with respect to a surface of a document as the subject in the document photographing mode and prevents capturing the image until a suitable angle of photography is detected in order to minimize distortions in the image captured of the document;

a compression unit which compresses the image data and generates a compressed image data;

a storage unit which stores the compressed image data;

a selection unit with which any of the normal photographing mode and the document photographing mode can be selected, and with which a destination to receive the image data can be selected;

a display unit which displays the image of the subject on a monitor before the image is photographed; and an image processing unit which subjects the image data to image processing depending on the selected photography mode and to image processing that a selected destination requires, prior to providing the image data to the destination;

wherein, in the document photographing mode, said display unit displays guidance to notify a user of the conditions during photography when the image of the subject is being displayed on the monitor.

35. The digital camera according to claim 34, wherein the guidance display is provided with a frame display with which the user recognizes the area of regular-size paper.

36. The digital camera according to claim 34 further comprising:

a memory which stores the names of destinations, telephone numbers or addresses, and frame display information that specifies whether the guidance is to be displayed on photographing in correlation with one another, wherein said display unit displays or does not display the guidance based on the frame display information stored in said memory.

37. The digital camera according to claim 34, wherein said display unit displays or does not display the guidance depending on the selected destination.

38. The digital camera according to claim 36, wherein an operator can freely add or change the contents of said memory.

39. A digital camera having a normal photographing mode and a document photographing mode, said digital camera comprising:

an image pickup unit which captures an image of a subject and converts the image to image data;

an angle of photography detection unit which detects an angle of photography with respect to a surface of a document as the subject in the document photographing mode and prevents capturing the image until a suitable angle of photography is detected in order to minimize distortions in the image captured of the document;

a selection unit with which any of the normal photographing mode and the document photographing mode can be selected, and with which a destination to receive the image data can be selected;

a display unit which displays the image of the subject on a monitor before the image is photographed; and an image processing unit which subjects the image data to image processing depending on the selected photography mode and to image processing that a selected destination requires, prior to providing the image data to the destination;

wherein, in the document photographing mode, said display unit displays guidance to notify a user of the conditions during photography when the image of the subject is being displayed on the monitor.

40. The digital camera according to claim 39, wherein the guidance display is provided with a frame display with which the user recognizes the area of regular-size paper.

41. The digital camera according to claim 39 further comprising:

a memory which stores the names of destinations, telephone numbers or addresses, and frame display information that specifies whether the guidance is to be displayed on photographing in correlation with one another, wherein said display unit displays or does not display the guidance based on the frame display information stored in said memory.

42. The digital camera according to claim 39, wherein said display unit displays or does not display the guidance depending on a destination.

43. The digital camera according to claim 41, wherein an operator can freely add or change the contents of said memory.

44. A digital camera having a normal photographing mode and a document photographing mode, said digital camera comprising:

an image pickup unit which captures an image of a subject and converts the image to image data;

a compression unit which compresses the image data and generates a compressed image data;

a storage unit which stores the compressed image data;

a selection unit with which any of the normal photographing mode and the document photographing mode can be selected, and with which a destination to receive the image data can be selected; and an angle of photography detection unit which detects an angle of photography with respect to a surface of the subject, wherein, in the document photographing mode, photography is started only when the angle of photography is substantially vertical in order to minimize distortions in the image captured of the subject.

45. The digital camera according to claim 44, wherein said angle of photography detection unit detects the angle of photography from the shape of the photographed subject.

46. A digital camera having a normal photographing mode and a document photographing mode, said digital camera comprising:

an image pickup unit which captures an image of a subject and converts the image to image data;

a selection unit with which any of the normal photographing mode and the document photographing mode can be selected, and with which a destination to receive the image data can be selected;

an angle of photography detection unit which detects an angle of photography with respect to the surface of a subject; and an image processing unit which subjects the image data to image processing depending on the selected photography mode and to image processing that a selected destination requires, prior to providing the image data to the destination;

wherein, in the document photographing mode, photography is started only when the angle of photography is substantially vertical in order to minimize distortions in the image captured of the subject.

47. The digital camera according to claim 46, wherein said angle of photography detection unit detects the angle of photography from the shape of the photographed subject.

48. A document photographing and transmitting method of a digital camera, said method comprising:

monitoring a subject on a display unit in response to instructions for monitoring;

displaying guidance on said display unit when the monitoring is performed;

capturing an image, converting the image to image data, and compressing the image data in response to instructions for photographing;

detecting an angle of photography before capturing the image and permitting image capture of a document only if the angle of photography has a predetermined value in order to minimize distortions in the image captured of the document;

storing the compressed image data in a storage unit;

selecting a destination to receive the image data;

reading the compressed image data stored in the storage unit and expanding the data in response to instructions for transmission;

subjecting the expanded image data to an image processing that the selected destination requires, prior to providing the image data to the destination; and transmitting the image data, that has been subjected to image processing, to the selected destination.

49. A document photographing and transmitting method of a digital camera, said method comprising:

monitoring a subject on a display unit in response to instructions for monitoring;

displaying guidance on said display unit when the monitoring is performed;

capturing an image and converting the image to image data in response to instructions for photographing;

detecting an angle of photography before capturing the image and permitting image capture of a document only if the angle of photography has a predetermined value in order to minimize distortions in the image captured of the document;

selecting a destination to receive the image data;

subjecting the image data to an image processing that the selected destination requires, prior to providing the image data to the destination; and transmitting the image data, that has been subjected to image processing, to the selected destination.

50. A digital camera according to claim 1, wherein said image processing unit recognizes a shape of said document to calculate a current angle of photography.

51. A digital camera according to claim 7, wherein said image processing unit recognizes a shape of said document to calculate a current angle of photography.

52. A digital camera according to claim 12, wherein said image processing unit recognizes a shape of said document to calculate a current angle of photography.

53. A document photographing and transmitting method according to claim 48, wherein in said detecting an angle of photography, a shape of said document is recognized and a current angle of photography is detected based on the shape of said document.

54. A digital camera according to claim 1, wherein a user arranges the digital camera such that the angle of photography is substantially perpendicular with respect to the surface of the document, in order to obtain the suitable angle of photography in the document photography mode.

55. A digital camera according to claim 7, wherein a user arranges the digital camera such that the angle of photography is substantially perpendicular with respect to the surface of the document, in order to obtain the suitable angle of photography in the document photography mode.

56. A digital camera according to claim 12, wherein a user arranges the digital camera such that the angle of photography is substantially perpendicular with respect to the surface of the document, in order to obtain the suitable angle of photography in the document photography mode.

57. A document photographing and transmitting method according to claim 48, said method further comprising:

arranging the digital camera by a user such that the angle of photography is substantially perpendicular with respect to a surface of the document.

58. A digital camera according to claim 54, wherein the image processing unit does not correct distortions related to the angle of photography of the image of the subject.

59. A digital camera according to claim 55, wherein the image processing unit does not correct distortions related to the angle of photography of the image of the subject.

60. A digital camera according to claim 56, wherein the image processing unit does not correct distortions related to the angle of photography of the image of the subject.

61. A document photographing and transmitting method according to claim 57, wherein said subjecting the image processing does not correct the distortions related to the angle of photography of the image.

* * * * *